United States Patent [19]
Yagi et al.

[11] 3,924,582
[45] Dec. 9, 1975

[54] AUXILIARY CHAMBERS FOR INTERNAL COMBUSTION PISTON ENGINES

[75] Inventors: Shizuo Yagi; Kiyoshi Miyaki, both of Osaka; Hiroshi Kogure, Tokorozawa, all of Japan

[73] Assignee: Honda Giken Kogyo Kabushiki Kaisha, Tokyo, Japan

[22] Filed: Feb. 4, 1974

[21] Appl. No.: 439,127

[30] Foreign Application Priority Data
Feb. 14, 1973 Japan............................. 48-17412

[52] U.S. Cl........ 123/32 SP; 123/148 C; 123/32 ST
[51] Int. Cl.².................... F02B 19/10; F02B 19/18
[58] Field of Search ........ 123/32 ST, 32 SP, 191 S, 123/191 SP, 32 L, 148 C, 148 DS, 75 B

[56] References Cited
UNITED STATES PATENTS
2,435,659  2/1948  Summers......................... 123/32 SP
FOREIGN PATENTS OR APPLICATIONS
902,433  12/1944  France............................ 123/32 SP

*Primary Examiner*—Charles J. Myhre
*Assistant Examiner*—Ronald B. Cox
*Attorney, Agent, or Firm*—Lyon and Lyon

[57] ABSTRACT

An internal combustion piston engine has a main combustion chamber and two symmetrically positioned auxiliary combustion chambers. A lean mixture is supplied through a main intake passage to the main chamber and controlled by a main intake valve. A rich mixture is supplied through an auxiliary intake passage to both of said auxiliary chambers, each controlled by a separate auxiliary intake valve. Each auxiliary chamber has a torch nozzle positioned to project an inclined jet flame into the main chamber. The torch nozzles extend in opposite directions with respect to a plane containing the centers of both auxiliary chambers. Each auxiliary chamber is provided with a spark plug.

4 Claims, 3 Drawing Figures 3,924,582

AUXILIARY CHAMBERS FOR INTERNAL COMBUSTION PISTON ENGINES

This invention relates to internal combustion piston engines of the type having a main combustion chamber and an auxiliary combustion chamber connected by a torch nozzle. A rich mixture supplied to the auxiliary chamber is ignited by a spark plug to project a jet flame through the torch nozzle into the main chamber to ignite a lean mixture therein. Engines of this type may operate with imperfect combustion because a single torch nozzle offset from the piston axis may not be capable of producing uniform combustion in the main combustion chamber.

In accordance with the present invention, more than one auxiliary chamber is provided for each main combustion chamber. Each of the auxiliary chambers has a torch nozzle positioned to direct an inclined flame jet into the main chamber, and the flame jets are symmetrically positioned to provide improved combustion in the main chamber.

Other and more detailed objects and advantages will appear hereinafter.

Figure 1:
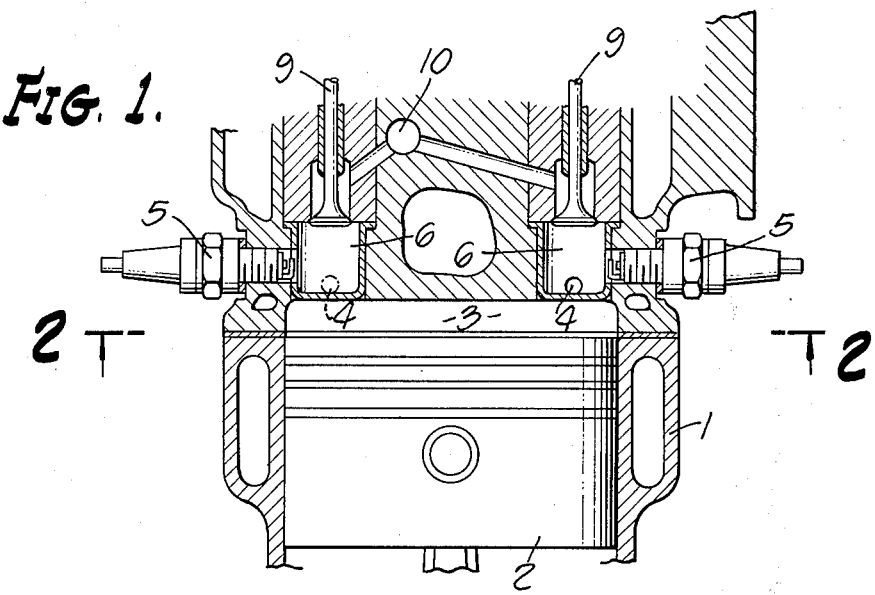
FIG. 1 is a sectional side elevation showing a preferred embodiment of this invention.
Figure 2:
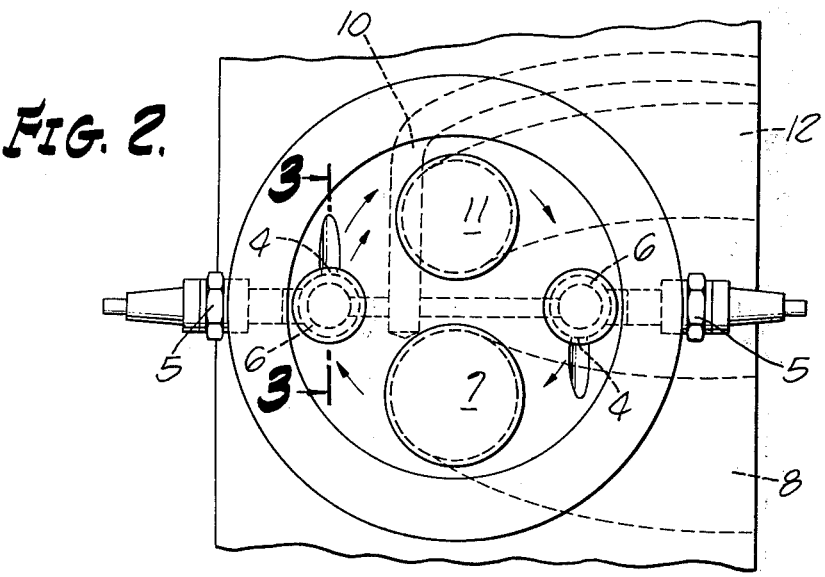
FIG. 2 is a bottom view taken substantially on the lines 2—2 as shown in FIG. 1.
Figure 3:
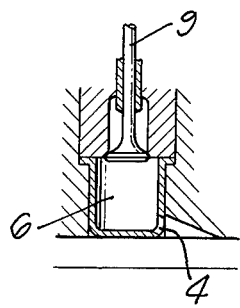
FIG. 3 is a sectional detail taken substantially on the lines 3—3 as shown in FIG. 2.

Referring to the drawings, the internal combustion piston engine generally designated 1 has a reciprocating piston 2 which forms one wall of the main combustion chamber 3. Two auxiliary combustion chambers 6 are provided on diametrially opposite sides of the main chamber 3 and each has a side aperture communicating with a spark plug 5. Each auxiliary chamber 6 is formed within a thin wall metallic liner and each liner has an opening 4 which acts as a torch nozzle connecting the auxiliary combustion chambers 6 with the main combustion chamber 3. As best shown in FIG. 2, each torch nozzle 4 is oriented to project a flame in a clockwise direction. FIG. 3 shows that each torch nozzle 4 is inclined downward toward the main combustion chamber 3.

A main intake valve 7 of conventional design controls flow of a lean mixture from the intake passage 8 to the main combustion chamber 3. Similarly, each of the auxiliary intake valves 9 controls the flow of rich mixture from the auxiliary intake passage 10 to one of the auxiliary chambers 6. The valves 9 are operated simultaneously. The exhaust valve 11 controls discharge of exhaust gases from the main combustion chamber through the exhaust passage 12.

In operation, the suction stroke of the piston 2 causes lean mixture to be drawn into the main combustion chamber 3 through the main intake passage 8, and through the open intake valve 7. At the same time rich mixture is drawn from the auxiliary intake passage 10 through open auxiliary intake valves 9 into the auxiliary chambers 6 and then into the main combustion chamber 3 through the torch nozzles 4. At the end of the following compression stroke of the piston 2, the spark plugs 5 ignite the mixture in the auxiliary chambers 6 and cause flame jets to be projected through the torch nozzles 4 to ignite the lean mixture in the main chamber 3. The flame jets from the torch nozzles project in opposite directions in reference to a plane passing between the centers of the two auxiliary chambers 6. In another word, the torch nozzles are so positioned that the torch flames flow in the same direction with that of the vortex flow in the main combustion chamber as illustrated in FIG. 2. The two jet flames extending in opposite directions to ignite the lean mixture in the main chamber 3 produce more complete combustion and improve the operation of the engine.

Having fully described our invention, it is to be understood that we are not to be limited to the details herein set forth, but that our invention is of the full scope of the appended claims.

We claim:

1. In an internal combustion piston engine having a valved intake passage for supplying a lean mixture to a main combustion chamber and a valved exhaust passage leading from said chamber, the improvement comprising, in combination: two auxiliary combustion chambers diametrically opposed and symmetrically positioned with respect to the main combustion chamber, ignition means associated with each auxiliary chamber, passage means for supplying the rich mixture to each of said auxiliary chambers, each auxiliary chamber having an auxiliary intake valve controlling flow of rich mixture thereto, respectively, and each having a torch nozzle connecting each auxiliary chamber to said main chamber, respectively, the torch nozzles extending in opposite directions with respect to a plane containing the centers of said auxiliary chambers.

2. The combination set forth in claim 1 in which a piston forms one wall of the main chamber and in which the torch nozzles are positioned so that each projects an inclined flame toward the top of the piston at the end of its compression stroke.

3. In an internal combustion engine, the combination of: walls cooperating with a piston to form a main combustion chamber, an intake passage for supplying a lean mixture to said chamber, a main intake valve controlling flow through said passage, an exhaust passage leading from said chamber and having an exhaust valve controlling flow therethrough, a pair of auxiliary combustion chambers symmetrically positioned with respect to said intake and exhaust valves, ignition means associated with each auxiliary chamber, passage means for supplying a rich mixture to each of said auxiliary chambers, each auxiliary chamber having an auxiliary intake valve controlling flow of rich mixture thereto, respectively, and each having a torch nozzle connecting each auxiliary chamber to said main chamber, respectively, the torch nozzles extending in opposite directions with respect to a plane containing the centers of said auxiliary chambers.

4. In an internal combustion engine, the combination of: walls cooperating with a piston to form a main combustion chamber, an intake passage for supplying a lean mixture to said chamber, a main intake valve controlling flow through said passage, an exhust passage leading from said chamber and having an exhaust valve controlling flow therethrough, a plurality of auxiliary combustion chambers equally spaced around the main combustion chamber, ignition means associated with each auxiliary chamber, passage means for supplying a rich mixture to each of said auxiliary chambers, each auxiliary chamber having an auxiliary intake valve controlling flow of rich mixture thereto, respectively, and each having a torch nozzle connecting each auxiliary chamber to said main chamber, respectively, said torch nozzle being positioned so that each projects an inclined flame toward the top of the piston at the end of said compression stroke.

* * * * *